Jan. 10, 1933. W. T. CRESPINEL 1,893,698
METHOD AND APPARATUS FOR PLACING SOUND RECORDS IN COLOR PHOTOGRAPHY
Filed July 28, 1930
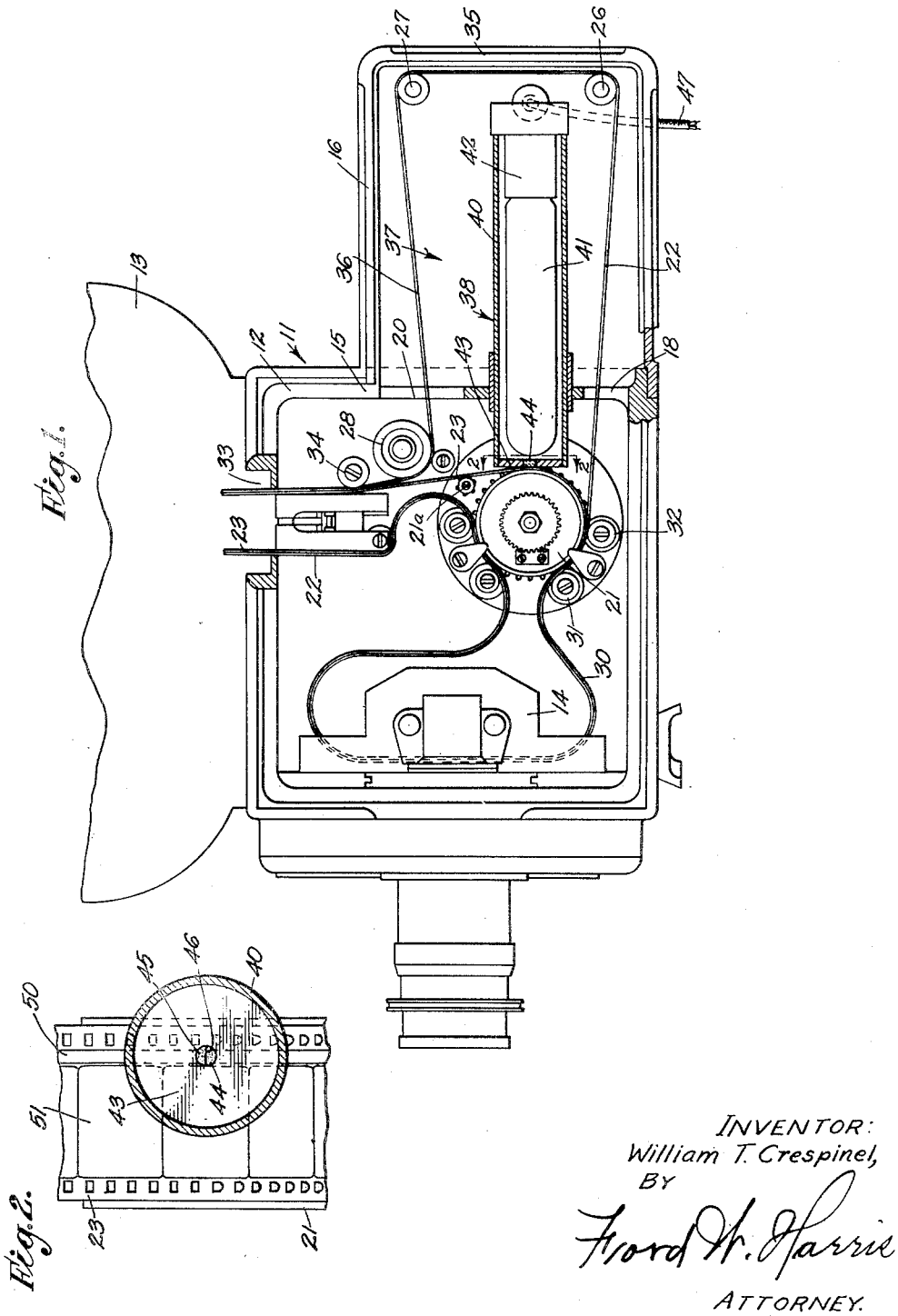
INVENTOR:
William T. Crespinel,
BY
Floyd W. Harris
ATTORNEY.

Patented Jan. 10, 1933

1,893,698

UNITED STATES PATENT OFFICE

WILLIAM T. CRESPINEL, OF LOS ANGELES, CALIFORNIA, ASSIGNOR TO MULTICOLOR, LTD., OF LOS ANGELES, CALIFORNIA, A CORPORATION OF CALIFORNIA

METHOD AND APPARATUS FOR PLACING SOUND RECORDS IN COLOR PHOTOGRAPHY

Application filed July 28, 1930. Serial No. 471,370.

My invention relates to the production of sound motion pictures in color and relates particularly to a method and apparatus for placing a sound record on a colored motion picture film. The invention has its principal utility in the making of negatives and subsequent preparation of positive motion picture films having colored images on the opposite sides thereof and a sound record along one edge. In this preferred process with which my invention is especially useful, a pair of unexposed motion picture negative films are carried in superimposed or face-to-face relationship through the photographing mechanism of a camera, one of these films being known as the red-sensitive film and the other being known as the blue-sensitive film for the reason that respectively they receive the yellow-red and blue-green color value images but themselves are not colored. After these films are exposed and are light-impressed with their respective color values, they are developed and then employed to print opposite sides of a double coated film, the two sides of the film then being colored so that they will cooperate to give a complete colored image when light is projected therethrough and onto a screen. By the use of my present method and apparatus I am able to form a sound record directly on a color-sensitive film during the photographing of a scene or action in such satisfactory manner that the sound record may be subsequently employed in the rendering of a sound program in conjunction with the exhibiting of the colored motion picture.

It is an object of my invention to provide a method of obtaining a direct sound record in the production of a colored sound motion picture by recording the sound on one of the color-sensitive films at the time an action or scene is photographed in color, and it is a further object of the invention to provide a camera having means therein for forming a light-produced sound record on one of the films, preferably the red sensitive film on which the color value images are photographically recorded.

It is a further object of the invention to provide in a camera means for separating the color-sensitive films after they have passed through the photographing mechanism of the camera and means for recording representations of sound modulations on the edge of one of said films while the two films are separated one from the other.

A further object of the invention is to provide in a camera of the above character a means for separating the color-sensitive films and forming a loop therebetween in which a variable density light device may be placed in such position that a fluctuating light will be impressed on one of the films, registering in striations on the sound track.

Further objects and advantages of the invention will be made evident throughout the following part of the specification.

Referring to the drawing, which is for illustrative purposes only,

Fig. 1 is a simple elevational view showing a camera embodying my invention, this camera being shown with the side cover removed, the standard mechanism thereof shown diagrammatically, and the new parts which my invention contributes shown in sufficient detail to enable one skilled in the art to apply them to a standard camera.

Fig. 2 is an enlarged sectional view taken substantially on a plane indicated by the line 2—2 of Fig. 1, showing the relative positions of the color-sensitive film which is to receive the sound record and the light gate through which a variable density or variable area sound recording light is projected onto the edge of the negative.

In Fig. 1 I show a camera 11 having a main casing 12 on which a film magazine 13 is mounted. The casing 12 is open on one side so as to give access to the interior mechanism in threading a film through the camera, the side opening of the camera being fitted with a light-proof cover or door which may be closed so as to protect the film from any exposure other than the photographic exposure which is accomplished by means of a photographing mechanism 14 situated at the forward end of the main casing 12. Mounted on the back wall 15 of the casing 12 and extending rearwardly therefrom is a loop housing 16 which communicates with the interior of the main casing 12 through openings 18 and 20 in the back wall 15. The housing 16 is also open on the left side so that a film may be threaded therethrough, and is fitted with a light-proof cover which is secured in place during the photographing of a motion picture production, action, or scene. Situated within the main casing 12 is a feed and take-off sprocket 21 which is driven at constant speed and is adapted to receive a pair of flexible color-sensitive film strips 22 and 23 from the magazine 13 and to feed these sensitive film strips to the photographing mechanism 14, which in the customary manner is equipped with intermittent means for moving the negatives and also with registering pins for holding the negatives in perfectly aligned or superimposed position during the time the shutter of the camera admits a photographic image. It is preferable, although not absolutely necessary, that the emulsion coatings of the films be adjacent to each other or in contact. In view of the fact that moving picture photographing mechanisms are well known to the art, it is not necessary to herein disclose the details of construction of the photographing mechanism 14 other than to mention its well known function.

In the method which I prefer to employ in the practice of my invention, the blue-sensitive negative strip or film 22, in passing through the photographing mechanism 14, is in front of the red-sensitive film or negative 23, in order that the light rays will first pass through the blue-sensitive negative 22. Within the housing 16 means for forming a loop of one of the films is provided in the form of rollers or guides 26 and 27, and above and to the right of the sprocket 21 is a secondary sprocket 28 which is driven continuously. After leaving the photographing mechanism 14, as indicated at 30, the red and blue-sensitive negatives 23 and 22 respectively are carried to the lower portion of the sprocket 21, where they are held in engagement with the sprocket by guide or hold-down rollers 31 and 32 in accordance with standard practice. The red-sensitive film 23 is carried upwardly around the right-hand portion of the sprocket 21, over a tautening sprocket 21a in such a manner as to at all times maintain the film taut while passing from the sprocket 21, and then is extended upwardly through a gate 33 leading to the magazine 13, passing adjacent to a guide roller 34. From the lower portion of the sprocket 21 and from the roller 32 the blue-sensitive film 22 is carried to the roller 26, up across the back wall 35 of the housing 16, over the roller 27, and leftwardly or forwardly to the sprocket 28, from which it is carried upwardly over the roller 34 and in contact with the red-sensitive film 23. In this manner the negatives 22 and 23 are separated, and within the housing 16 of the camera structure the negative 22 is formed into a loop 36 which defines a space 37 adjacent to and rightward of that portion of the red-sensitive film 23 which extends upwardly around the rightward part of the sprocket 21. Within the loop 36 formed by the blue-sensitive film 22 and in the space 37 I place a photographic recording means 38 consisting of a light tube 40 mounted in the rear wall 15 of the casing 12 and having therein a fluctuable light producing means preferably consisting of an aeo light 41 mounted in a socket 42 which is longitudinally adjustable for focusing purposes. The light tube 40 is of light-proof construction and in its leftward or front wall 43 a quartz disc 44 is placed, this quartz disc 44 having its leftward or outer face cylindrically concave to correspond to the curvature of the film 23 as it passes around the sprocket 21. The rightward or inner face of the quartz disc 44 is coated with a layer of silver 45, and in this layer of silver a horizontal scratch 46 is made .10 inches long and .0006 inches wide, this scratch being at right angles to the travel of the film and forming an aperture through which the fluctuating or variable density light used by the aeo tube is directed against the rightward edge of the red-sensitive film 23. From the rearward end of the tube 40 and the socket 42 a cable 47 is carried out through the housing 16 for connection with the electrical or amplifying equipment of a sound receiving device, such as used in the recording of sound with motion pictures.

In accordance with standard practice, the photographic aperture or gate of the photographic equipment 14 is reduced in width so that, as indicated in Fig. 2, an unexposed strip 50 is left adjacent to the frames 51 photographed on the color-sensitive films 22 and 23. As further shown in Fig. 2, the recording means 38 is placed in such position that the scratch or light aperture 46 thereof will coincide with the unexposed strip on the rightward edge of the red-sensitive film 23. As the red-sensitive film 23 passes the light aperture 46, the unexposed sensitized emulsion forming the strip 50 of the red-sensitive film 23 will be exposed in proportion to the density of the light admitted by the aeo light 41. The strip 50 on the edge of the blue-sensitive film 22 remains unexposed so that when the color-sensitive films are subsequently developed, the edge strip of the blue-sensitive film 22 will be clear or completely transparent, whereas the edge strip of the red-sensitive film 23 will contain a photographic record representing the sounds from which the aeo light was modulated during the taking of the color value negatives. When these cooperative blue and red color-negatives or films 22 and 23 are subsequently employed for the printing of a color positive, the sound record will appear on the edge of only one emulsion coating of a double emulsion film.

In the preferred practice of the invention the forming of the sound record on the edge of the red-sensitive negative 23 results in forming the sound record on the blue side of the color-positive. On the red side of this color-positive the edge strip corresponding in position to the sound track of the blue side is not exposed and therefore is transparent after the color-positive is developed, and colored or dyed.

Although I have herein shown and described a simple and practical embodiment of my invention, it is recognized that certain parts or elements thereof are representative of other parts, elements, or mechanisms which may be employed in substantially the same manner to accomplish substantially the same results; therefore, it is to be understood that the invention is not to be limited to the details disclosed herein but is to be accorded the full scope of the following claims.

I claim as my invention:

1. A method of recording sound in conjunction with obtaining exposed negative color films, including: conducting a pair of color films in contact through a prescribed path; impressing color images from a scene on said films of sufficiently reduced width to leave an unexposed strip on the edge of each film; separating the films; recording sound accompanying said scene on the unexposed edge of one of said films while said films are separated; developing said films so as to leave a sound strip on the edge of one of said films and a transparent strip on the edge of the other of said films; and forming superposed positives from said films with said strips in registry.

2. A method of recording sound in conjunction with obtaining exposed negative color films, including: conducting a pair of color films in contact through a prescribed path; impressing color images from a scene on said films of sufficiently reduced width to leave an unexposed strip on the edge of each film; separating the films; recording sound accompanying said scene on the unexposed edge of one of said films while said films are separated; developing said films so as to leave a sound strip on the edge of one of said films and a transparent strip on the edge of the other of said films; and printing said films on the opposite sides of a double emulsion positive.

3. A method of recording sound in conjunction with obtaining exposed negative color films, including: conducting a red-sensitive film and a blue-sensitive film in face-to-face contact through a prescribed path; impressing color images on said films of sufficiently reduced width to leave an unexposed strip on the edge of each film; separating the films; recording sound on the unexposed edge of said red-sensitive film while said films are separated; developing said films so as to leave a sound strip on the edge of said red-sensitive film and a transparent strip on the edge of said blue-sensitive film; and forming superposed positives from said films with said strips in registry.

4. A method of recording sound in conjunction with obtaining exposed negative color motion picture film, including: conducting a red-sensitive film and a blue-sensitive film in face-to-face contact through a prescribed path; impressing color images on said films of sufficiently reduced width to leave an unexposed strip on the edge of each film; separating the films; recording sound on the unexposed edge of said red-sensitive film while said films are separated; developing said films so as to leave a sound strip on the edge of said red-sensitive film and a transparent strip on the edge of said blue-sensitive film; and printing a color-positive transparency from said combined films.

5. A method of recording sound in conjunction with obtaining exposed negative color films, including: conducting a pair of color films in contact through a prescribed path; impressing color images on said films of sufficiently reduced width to leave an unexposed strip on the edge of each film; separating said films so as to form a loop thereby; creating a light; directing said light within said loop and against the unexposed strip of one of said films; fluctuating said light in accordance with sounds to be recorded; subsequently winding said films; developing said films so as to leave a sound strip on the edge of one of said films and a transparent strip on the edge of the other of said films; and printing said films on the opposite sides of a double emulsion positive.

6. A camera for producing a sound track on color films, including: a photographic mechanism adapted to leave unexposed strips along the edges of films conducted therethrough, said mechanism including means for projecting a light image to films in said mechanism; means for moving a pair of films through said photographic mechanism in face-to-face contact; rollers placed so as to separate said films after they leave said photographic mechanism; and means for directing a sound fluctuated light beam against the unexposed strip of one of said films while said films are separated.

7. A camera for producing a sound track on color films, including: a photographic mechanism adapted to leave unexposed strips along the edges of films conducted therethrough, said mechanism including means for projecting a light image to films in said mechanism; means for moving a pair of films through said photographic mechanism in face-to-face contact; rollers placed so as to separate said films in the form of a loop; and light means disposed within said loop and being adapted to direct a sound fluctuated light beam against the unexposed strip of one of said films.

8. A camera for producing a sound track on color films, including: a photographic mechanism adapted to leave unexposed strips along the edges of films conducted therethrough, said mechanism including means for projecting a light image to films in said mechanism; means for moving a pair of films through said photographic mechanism in face-to-face contact; rollers placed so as to separate said films in the form of a loop; light means disposed within said loop and being adapted to direct a sound fluctuated light beam against the unexposed strip of a selected one of said films; sprocket means for holding said selected film taut during exposure of the strip portion thereof; and means for withdrawing said films from said camera in face-to-face position.

9. A camera for producing a sound track on color films, including: a photographic mechanism adapted to leave unexposed strips along the edges of films conducted therethrough, said mechanism including means for projecting a light image to films in said mechanism; a continuously rotating sprocket receiving said films from said photographic mechanism; rollers so placed as to guide the inner of said films around said sprocket and to direct the outer of said films through a loop path; and means disposed within the space confined in said loop path for directing a recording light on the unexposed strip of one of said films.

10. A camera for producing a sound track on color films, including: a photographic mechanism adapted to leave unexposed strips along the edge of films conducted therethrough, said mechanism including means for projecting a light image to films in said mechanism; a continuously rotating sprocket receiving said films from said photographic mechanism; rollers so placed as to guide the inner of said films around said sprocket and to direct the outer of said films through a loop path; and means disposed within the space confined in said loop path for directing a recording light against the inner of said films.

11. A camera for producing a sound track on color films, including: a main casing; a photographic mechanism in said main casing adapted to leave an unexposed strip on the edge of a film; means for feeding a pair of color films through said photographic mechanism in face-to-face contact; a sprocket receiving said films from said photographic mechanism; a loop housing extending rearwardly from said main casing at a point adjacent to said sprocket; means in said loop housing forming a loop of the outer of said films; a light receptacle in said housing having a light aperture directed toward the inner of said films passing over said sprocket, said light receptacle extending within said loop of said outer film; light producing means in said light receptacle; means for fluctuating said light; and means for withdrawing said films from said main casing.

In testimony whereof, I have hereunto set my hand at Los Angeles, California, this 23rd day of July, 1930.

WILLIAM T. CRESPINEL.